(12) United States Patent
Wang et al.

(10) Patent No.: US 9,939,700 B2
(45) Date of Patent: Apr. 10, 2018

(54) DISPLAY PANEL AND DISPLAY APPARATUS

(71) Applicant: BOE Technology Group Co., Ltd., Beijing (CN)

(72) Inventors: Yingtao Wang, Beijing (CN); Suzuki Teruaki, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/469,668

(22) Filed: Mar. 27, 2017

(65) Prior Publication Data

US 2017/0199406 A1    Jul. 13, 2017

Related U.S. Application Data

(63) Continuation-in-part of application No. 14/313,455, filed on Jun. 24, 2014, now Pat. No. 9,632,371.

(30) Foreign Application Priority Data

Apr. 15, 2014    (CN) .......................... 2014 1 0150113

(51) Int. Cl.
*G02F 1/1347* (2006.01)
*G02F 1/139* (2006.01)
(Continued)

(52) U.S. Cl.
CPC ......... *G02F 1/1393* (2013.01); *G02B 6/0031* (2013.01); *G02B 6/0038* (2013.01);
(Continued)

(58) Field of Classification Search
CPC .................... G02F 2001/13478; G02F 1/1347
See application file for complete search history.

(56) References Cited

U.S. PATENT DOCUMENTS 3,914,022 A * 10/1975 Kashnow .............. G02F 1/1393
349/130
7,092,062 B2    8/2006 Ozawa
(Continued)

FOREIGN PATENT DOCUMENTS

CN       1414419 A    4/2003
CN     102411225 A    4/2012
(Continued)

OTHER PUBLICATIONS

First Office Action, including Search Report, for Chinese Patent Application No. 201410150113.X, dated Feb. 2, 2016, 15 pages.

*Primary Examiner* — Phu Vu
(74) *Attorney, Agent, or Firm* — Westman, Champlin & Koehler, P.A.

(57) ABSTRACT

The present invention discloses a display panel comprises: a cholesteric liquid crystal cell configured to convert a light passing therethrough into a polarized light; a first light modulator, which is provided at a light output side of the cholesteric liquid crystal cell and directly contacts the cholesteric liquid crystal cell, configured to generate a phase retardation in the polarized light passing therethrough so as to modulate a polarization of the polarized light; a first linear polarizer provided at a side of the first light modulator opposite from the cholesteric liquid crystal cell and configured to selectively permit the polarized light modulated by the first light modulator to pass therethrough. The present invention also discloses a display apparatus.

20 Claims, 5 Drawing Sheets

(51) Int. Cl.
    *G02F 1/13363*   (2006.01)
    *G02F 1/1343*   (2006.01)
    *G02F 1/1335*   (2006.01)
    *F21V 8/00*   (2006.01)
    *G02F 1/137*   (2006.01)
(52) U.S. Cl.
    CPC ......... *G02B 6/0056* (2013.01); *G02B 6/0066* (2013.01); *G02F 1/1347* (2013.01); *G02F 1/13363* (2013.01); *G02F 1/13718* (2013.01); *G02F 1/133528* (2013.01); *G02F 1/134363* (2013.01); *G02B 6/0028* (2013.01); *G02F 2001/13478* (2013.01); *G02F 2001/133531* (2013.01); *G02F 2001/133541* (2013.01); *G02F 2001/133633* (2013.01); *G02F 2001/133638* (2013.01); *G02F 2201/121* (2013.01); *G02F 2201/123* (2013.01); *G02F 2413/02* (2013.01)

(56) References Cited

U.S. PATENT DOCUMENTS

| | | | | |
|---|---|---|---|---|
| 2003/0081161 | A1* | 5/2003 | Ozawa | G02F 1/133536 349/115 |
| 2003/0231269 | A1* | 12/2003 | Ma | G02F 1/13718 349/115 |
| 2005/0151912 | A1* | 7/2005 | Miyachi | G02F 1/133753 349/141 |
| 2006/0077325 | A1* | 4/2006 | Li | G02B 5/3016 349/115 |
| 2015/0192727 | A1* | 7/2015 | Kuo | G02B 6/0061 349/65 |

FOREIGN PATENT DOCUMENTS

| | | |
|---|---|---|
| CN | 103353682 A | 10/2013 |
| JP | 6-230362 A | 8/1994 |
| JP | 11-231304 A | 8/1999 |

* cited by examiner

DISPLAY PANEL AND DISPLAY APPARATUS

CROSS-REFERENCE TO RELATED APPLICATION

This application is a continuation-in-part of U.S. application Ser. No. 14/313,455, filed on Jun. 24, 2014, entitled "Display Panel and Display Apparatus", and claims the benefit of Chinese Patent Application No. 201410150113.X filed on Apr. 15, 2014 in the State Intellectual Property Office of China, the disclosures of which are incorporated herein by their reference.

BACKGROUND OF THE INVENTION

Field of the Invention

The present invention relates to a display technology field, more particularly, relates to a display panel and a display apparatus.

Description of the Related Art

With development of display technology and increasing demand on portable electronic products, in recent years, persons in this art are focusing attention on a transparent display apparatus, which can display an image thereon and allow an object at the back of the display apparatus to be visible from the front of the display apparatus.

So far, although there are many kinds of materials adapted to achieve a transparent display, a preferable transparent display material comprises cholesteric liquid crystal because the cholesteric liquid crystal possesses unique characteristics. The cholesteric liquid crystal contains many layers of cholesteric liquid crystal molecules, and each layer of cholesteric liquid crystal molecules has the same arrangement direction. The cholesteric liquid crystal molecules are laminated in a layer-by-layer way to form a spiral structure. When the arrangement direction of the cholesteric liquid crystal molecules is rotated from an initial orientation by 360 degrees to return to the initial orientation again, the spiral structure goes through a spiral pitch. Depending on spiral direction, the cholesteric liquid crystal is classified into a left-handed cholesteric liquid crystal having a left-handed circular polarization and a right-handed cholesteric liquid crystal having a right-handed circular polarization. When the cholesteric liquid crystal exhibits a planar texture state distribution, the cholesteric liquid crystal has a selectively reflective characteristic. In such a case, the left-handed circular polarization is capable of reflecting a left-handed circularly polarized light having a wavelength similar to the pitch of the cholesteric liquid crystal, but permitting the right-handed circularly polarized light and a light having a wavelength different from the left-handed circularly polarized light to pass therethrough. The right-handed circular polarization is capable of reflecting a right-handed circularly polarized light having a wavelength similar to the pitch of the cholesteric liquid crystal, but permitting the left-handed circularly polarized light and a light having a wavelength different from the right-handed circularly polarized light to pass therethrough. When the cholesteric liquid crystal molecule is rotated by 90 degrees to become a vertical texture state distribution, that is, when a direction in which the cholesteric liquid crystal molecule extends is parallel to an incident direction of a light, both the left-handed circularly polarized light and the right-handed circularly polarized light can pass through the cholesteric liquid crystal. Because of the above characteristics of the cholesteric liquid crystal, the cholesteric liquid crystal is generally applied in a transparent display panel, and a backlight source that can emit a light having a wavelength similar to the pitch of the cholesteric liquid crystal is adopted to provide a backlight for the transparent display panel, so as to achieve a normal display of the transparent display panel. Also, an ambient light having a wavelength considerably different from the pitch of the cholesteric liquid crystal can pass through the transparent display panel, so as to keep the transparent effect of the transparent display panel.

However, as for the transparent display panel of cholesteric liquid crystal in the prior arts, in order to achieve the normal display of the transparent display panel, it generally needs to provide a drive electrode to drive the cholesteric liquid crystal to deflect. However, a drive voltage, which is applied to the drive electrode to drive the cholesteric liquid crystal to deflect, is very high. For example, the drive voltage is often set to be 40V or more. Accordingly, the high drive voltage of the cholesteric liquid crystal limits the wide application of the cholesteric liquid crystal in the display field.

SUMMARY OF THE INVENTION

The present invention has been made to overcome or alleviate at least one aspect of the above mentioned disadvantages.

An object of the present invention is to provide a display panel and a display apparatus comprising the display panel, wherein a cholesteric liquid crystal cell of the display panel needs not to be provided with a drive electrode to drive the cholesteric liquid crystal to deflect. As a result, it does not need to apply a high drive voltage to drive the cholesteric liquid crystal to deflect, thereby decreasing the drive voltage of the display panel.

According to an aspect of the present invention, there is provided a display panel, comprising:

a cholesteric liquid crystal cell configured to convert a light passing therethrough into a polarized light;

a first light modulator, which is provided at a light output side of the cholesteric liquid crystal cell and directly contacts the cholesteric liquid crystal cell, configured to generate a phase retardation in the polarized light passing therethrough so as to modulate a polarization of the polarized light; and a first linear polarizer provided at a side of the first light modulator opposite from the cholesteric liquid crystal cell and configured to selectively permit the polarized light modulated by the first light modulator to pass therethrough.

In the display panel according to the above exemplary embodiment of the present invention, when a light having a wavelength similar to the pitch of the cholesteric liquid crystal in the cholesteric liquid crystal cell is irradiated on the cholesteric liquid crystal cell, a circularly polarized light having a opposite circular polarization from that of the cholesteric liquid crystal is allowed to pass through the cholesteric liquid crystal cell and is irradiated on the first light modulator. At this time, when it needs to achieve a bright state display of the display panel, the drive electrode drives the liquid crystal molecules in the liquid crystal layer to deflect by a certain angle, so as to regulate an amount of the phase retardation of the circularly polarized light emitted from the cholesteric liquid crystal cell into the first light modulator, which is generated when the circularly polarized light passes through the first light modulator. In this way, after passing through the first light modulator, the circularly polarized light is converted into a linearly polarized light having a polarization orientation parallel to a transmission axis of the first linear polarizer, and the linearly polarized light having the polarization orientation parallel to the transmission axis of the first linear polarizer can pass through the first linear polarizer. As a result, the bright state display of the display panel is achieved. When it needs to achieve a dark state display of the display panel, the drive electrode again drives the liquid crystal molecule in the liquid crystal layer to deflect by a certain angle, so as to again regulate the amount of the phase retardation of the circularly polarized light emitted from the cholesteric liquid crystal cell into the first light modulator, which is generated when the circularly polarized light passes through the first light modulator. In this way, after passing through the first light modulator, the circularly polarized light is converted into a linearly polarized light having a polarization orientation perpendicular to the optical axis of the first linear polarizer, and the linearly polarized light having the polarization orientation perpendicular to the transmission axis of the first linear polarizer cannot pass through the first linear polarizer. As a result, the dark state display of the display panel is achieved.

Accordingly, in the display panel according to the above exemplary embodiments, it only needs to drive the liquid crystal molecules in the first light modulator to deflect by the drive electrode of the first light modulator, the amount of the phase retardation of the circularly polarized light emitted from the cholesteric liquid crystal cell into the first light modulator can be regulated when the circularly polarized light passes through the first light modulator. Thereby, the polarization orientation of the circularly polarized light can be changed, and the circularly polarized light can be converted into the linearly polarized light having the polarization orientation parallel to or perpendicular to the transmission axis of the first linear polarizer, so that the linearly polarized light is allowed to pass through the first linear polarizer or is blocked by the first linear polarizer. If the linearly polarized light with the changed polarization orientation is allowed to pass through the first linear polarizer, the bright state display is achieved. If the linearly polarized light with the changed polarization orientation is blocked by the first linear polarizer, the dark state display is achieved.

Accordingly, in the present invention, the bright state display or the dark state display of the display panel can be achieved without providing a drive electrode in the cholesteric liquid crystal cell to drive the cholesteric liquid crystal molecules to deflect. As a result, in the present invention, the drive voltage of the display panel of the cholesteric liquid crystal is decreased, thereby overcoming the problem that the display panel of the cholesteric liquid crystal in the prior art needs a very high drive voltage.

According to an exemplary embodiment of the present invention, the first light modulator comprises a nematic liquid crystal cell and a quarter-wave plate successively disposed at the light output side of the cholesteric liquid crystal cell; and an angle between an optical axis of the quarter-wave plate and a transmission axis of the first linear polarizer is set to be equal to 45 degrees.

In the above exemplary embodiment, after a right-handed circularly polarized light from a left-handed cholesteric liquid crystal cell successively passes through the nematic liquid crystal cell and the quarter-wave plate, the right-handed circularly polarized light may be converted, as required, into a linearly polarized light having a polarization orientation parallel to the transmission axis of the first linear polarizer or a linearly polarized light having a polarization orientation perpendicular to the transmission axis of the first linear polarizer, so that the first linear polarizer can block or allow the linearly polarized light to pass therethrough. As a result, the dark state display or the bright state display of the display apparatus can be achieved.

According another exemplary embodiment of the present invention, the nematic liquid crystal cell comprises: a first substrate and a second substrate assembled together; a nematic liquid crystal layer filled between the first substrate and the second substrate; and a drive electrode. The drive electrode comprises a pixel electrode disposed on a side of the first substrate facing the second substrate and a common electrode disposed on a side of the second substrate facing the first substrate, so that liquid crystal molecules of the nematic liquid crystal layer can be driven to deflect in a plane perpendicular to the first substrate.

In the above exemplary embodiment, when a voltage is applied to the common electrode and the pixel electrode, the liquid crystal molecules are driven to deflect from a planar texture state to a vertical texture state in the plane perpendicular to the first substrate, the right-handed circularly polarized light is not delayed in its phase and continues to propagate forward in its original form. As a result, in this case, the right-handed circularly polarized light cannot pass through the quarter-wave plate and the first linear polarizer. When there is no voltage applied to the common electrode and the pixel electrode, the liquid crystal molecules keep the planar texture state distribution, and can delay the phase of the right-handed circularly polarized light from the nematic liquid crystal cell by $\lambda/2$, so that the right-handed circularly polarized light is converted into the left-handed circularly polarized light which can pass through the quarter-wave plate and the first linear polarizer.

According another exemplary embodiment of the present invention, the light modulator is configured to be an in-plane switching liquid crystal cell comprising: an upper substrate and a lower substrate assembled together; a nematic liquid crystal layer filled between the upper substrate and the lower substrate; and a drive electrode. The drive electrode comprises two strip in-plane switching electrodes disposed to oppose to each other between the upper substrate and the lower substrate; and two sides, facing each other, of the two strip in-plane switching electrodes are arranged to be perpendicular to a side of the upper substrate facing the lower substrate, so that liquid crystal molecules of the nematic liquid crystal layer can be driven to deflect in a plane parallel to the upper substrate and the lower substrate.

In the above exemplary embodiment, after a right-handed circularly polarized light from a left-handed cholesteric liquid crystal cell passes through the in-plane switching liquid crystal cell, the deflection orientation of the liquid crystal molecules in the in-plane switching liquid crystal cell may be regulated as required, so that the right-handed circularly polarized light may be converted into a linearly polarized light having a polarization orientation parallel to the transmission axis of the first linear polarizer or a linearly polarized light having a polarization orientation perpendicular to the transmission axis of the first linear polarizer. In this way, the first linear polarizer can block or allow the linearly polarized light to pass therethrough, so that the dark state display or the bright state display of the display panel can be achieved.

According another exemplary embodiment of the present invention, an angle between a direction in which the two strip in-plane switching electrodes extend and an transmission axis of the first linear polarizer is set to be equal to 45 degrees. In this exemplary embodiment, it can ensure that the liquid crystal molecules can be driven to deflect in a plane parallel to the upper substrate and the lower substrate after a voltage is applied to the two strip in-plane switching electrodes.

According another exemplary embodiment of the present invention, the display panel may further comprise a second light modulator and a second linear polarizer successively disposed at a light input side of the cholesteric liquid crystal cell, and configured to convert a light irradiated toward the cholesteric liquid crystal cell into a circularly polarized light, wherein an transmission axis of the second linear polarizer is arranged to be perpendicular to an transmission axis of the first linear polarizer.

In the above exemplary embodiment, after a natural light passes through the second linear polarizer, a linearly polarized light having a polarization orientation parallel to the transmission of the second linear polarizer can be obtained. When the linearly polarized light passes through the second light modulator, the linearly polarized light can be converted into a circularly polarized light having an opposite circular polarization from the circular polarization of the cholesteric liquid crystal cell, and thus can pass through the cholesteric liquid crystal cell and is irradiated toward the first light modulator. Thereafter, the liquid crystal molecules in the first light modulator can be driven, as required, to deflect by the drive electrode of the first light modulator, so as to change the polarization orientation of the polarized light passed through the first light modulator. As a result, the bright state display or the dark state display of the display panel can be achieved.

Accordingly, the display panel comprising the above second light modulator and the second linear polarizer can be used with a backlight source with a conventional configuration, thereby widening the application of the above display panel.

According another exemplary embodiment of the present invention, the second light modulator is configured to be an in-plane switching liquid crystal cell comprising an upper substrate and a lower substrate assembled together; a nematic liquid crystal layer is filled between the upper substrate and the lower substrate of the second light modulator; and two strip in-plane switching electrodes are disposed to oppose to each other between the upper substrate and the lower substrate of the second light modulator, so that liquid crystal molecules of the nematic liquid crystal layer can be driven to deflect in a plane parallel to the upper substrate of the second light modulator.

In the above exemplary embodiment, when the linearly polarized light passing through the second linear polarizer is irradiated on the in-plane switching liquid crystal cell, the liquid crystal molecule may be driven, as required, to deflect by the strip in-plane switching electrode. As a result, after passing through the in-plane switching liquid crystal cell, the linearly polarized light is converted into the left-handed circularly polarized light or the right-handed circularly polarized light.

According another exemplary embodiment of the present invention, both angles between directions in which the two strip in-plane switching electrodes of the second light modulator extend and a transmission axis of the second linear polarizer is set to be equal to 45 degrees. In this exemplary embodiment, after a voltage is applied to the two opposite strip in-plane switching electrodes, the liquid crystal molecule can be driven to deflect by 90 degrees in a plane parallel to the upper substrate and the lower substrate. As a result, after passing through the in-plane switching liquid crystal cell, the linearly polarized light can be converted into the circularly polarized light as required.

According another exemplary embodiment of the present invention, the second light modulator comprises a quarter-wave plate; and an angle between an optical axis of the quarter-wave plate of the second light modulator and a transmission axis of the second linear polarizer is set to be equal to −45 degrees. In this exemplary embodiment, after successively passing through the second linear polarizer and the quarter-wave plate, a light can be converted into a circularly polarized light having a circular polarization opposite to the circular polarization of the cholesteric liquid crystal cell, and thus can pass through the cholesteric liquid crystal cell and is irradiated on the first light modulator. Then, the first light modulator regulates the polarization orientation of the circularly polarized light from the cholesteric liquid crystal cell according to the requirement on the display effect of the display panel, so that the bright state display or the dark state display of the display panel can be achieved.

According to another aspect of the present invention, there is provided a display apparatus comprising a backlight source and a display panel according to any one of above embodiments. The display panel is disposed at a light output side of the backlight source.

According an exemplary embodiment of the present invention, the display panel further comprises a second light modulator and a second linear polarizer successively disposed at a light input side of the cholesteric liquid crystal cell and configured to convert a light irradiated toward the cholesteric liquid crystal cell into a circularly polarized light; an transmission axis of the second linear polarizer is arranged to be perpendicular to an transmission axis of the first linear polarizer; and the second linear polarizer is directly disposed inside the backlight source.

According another exemplary embodiment of the present invention, the backlight source comprising: a laser source; a second linear polarizer disposed at a light output side of the laser source; a first light guide plate and a second light guide plate disposed at a side of the second linear polarizer opposite from the laser source; and a diffusion sheet disposed at a light output side of the second light guide plate. The display panel further comprises a second light modulator disposed at a light input side of the cholesteric liquid crystal cell, and the second light modulator and the second linear polarizer are configured to together convert a light irradiated toward the cholesteric liquid crystal cell into a circularly polarized light. A transmission axis of the second linear polarizer is arranged to be perpendicular to a transmission axis of the first linear polarizer.

According another exemplary embodiment of the present invention, the backlight source comprises: a light source, a light guide plate provided near the light source, and a refection layer provided below the light guide plate. A microstructure including convexes and concaves is formed on a reflection surface of the refection layer.

In the display panel according to the above exemplary embodiments of the present invention, the bright state display or the dark state display of the display panel can be achieved only by driving the liquid crystal molecules in the first light modulator to deflect, instead of providing a drive electrode in the cholesteric liquid crystal cell to drive the cholesteric liquid crystal in the cholesteric liquid crystal cell. In this way, in the display apparatus having the above display panel according to the exemplary embodiments of the present invention, the bright state display or the dark state display of the display apparatus can be achieved without providing the drive electrode in the cholesteric liquid crystal cell to drive the cholesteric liquid crystal molecules to deflect, thereby decreasing the drive voltage of the display apparatus of the cholesteric liquid crystal, overcoming the problem that the display apparatus of the cholesteric liquid crystal in the prior art needs a very high drive voltage. Also, in the display panel according to the above exemplary embodiments of the present invention, since the polarization of the polarized light may be changed by the first light modulator, it is not necessary to provide any polarizer at the side of the first light modulator adjacent to the cholesteric liquid crystal cell. As a result, it may reduce a layer of polarizer, thus reducing the dependence on the polarizer to a certain extent, and decreasing the manufacturing cost.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
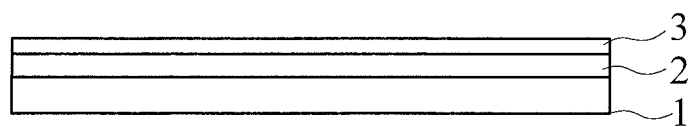
FIG. 1 is an illustrative configuration view of a display panel according to a first exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a display panel, comprising: a cholesteric liquid crystal cell in which a cholesteric liquid crystal exhibiting a planar texture state distribution is filled; a first light modulator provided at a light output side of the cholesteric liquid crystal cell, configured to generate a phase retardation in a polarized light passing therethrough so as to regulate a polarization of the polarized light, and comprising a liquid crystal layer and a drive electrode for driving liquid crystal molecules in the liquid crystal layer to deflect so as to regulate an amount of phase retardation of the polarized light passing through the liquid crystal layer; and a first linear polarizer provided at a side of the first light modulator opposite from the cholesteric liquid crystal cell and configured to selectively permit the polarized light modulated by the first light modulator to pass therethrough.

First Embodiment

Figure 2:
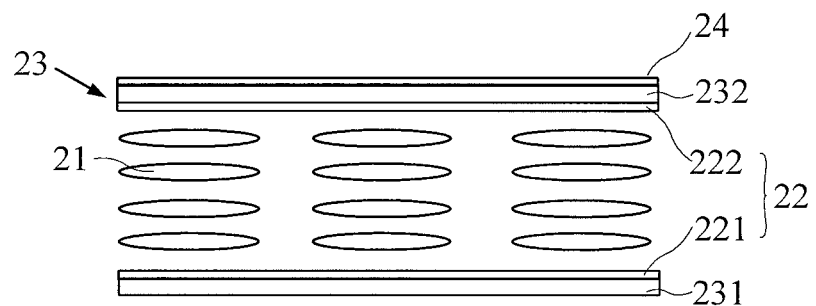
FIG. 2 is an illustrative configuration view of a first light modulator including a nematic liquid crystal cell of the display panel according to the first exemplary embodiment of the present invention.
Figure 3:
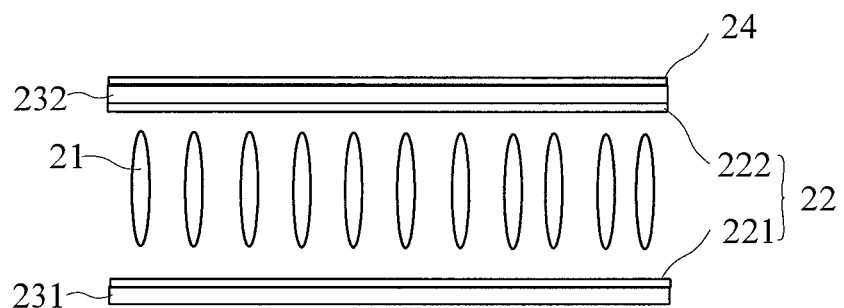
FIG. 3 is an illustrative configuration view of a first light modulator including a nematic liquid crystal cell of the display panel according to the first exemplary embodiment of the present invention, in which liquid crystal molecules in the display panel have been deflected.

As shown in FIG. 1, in an exemplary embodiment of the present invention, there is provided a display panel mainly comprising:

a cholesteric liquid crystal cell 1 in which a cholesteric liquid crystal exhibiting a planar texture state distribution is filled;

a first light modulator 2 provided at a light output or emergence side of the cholesteric liquid crystal cell 1, as shown in FIGS. 2-3, wherein the first light modulator 2 is configured to generate a phase retardation in a polarized light passing therethrough so as to modulate a polarization of the polarized light, and the first light modulator 2 comprises a liquid crystal layer 21 and a drive electrode 22 for driving liquid crystal molecules in the liquid crystal layer 21 to deflect so as to regulate an amount of phase retardation of the polarized light passing through the liquid crystal layer 21; and a first linear polarizer 3 provided at a side of the first light modulator 2 opposite from the cholesteric liquid crystal cell 1 and configured to selectively permit the polarized light modulated by the first light modulator 2 to pass therethrough.

In an exemplary embodiment of the present invention, the cholesteric liquid crystal cell 1 comprises a first transparent substrate and a second transparent substrate assembled together, and the cholesteric liquid crystal filled between the first transparent substrate and the second transparent substrate.

In the display panel according to the present exemplary embodiment of the present invention, on one hand, when a light having a wavelength similar to a pitch of the cholesteric liquid crystal in the cholesteric liquid crystal cell 1 and having a circular polarization same to that of the cholesteric liquid crystal is irradiated on the cholesteric liquid crystal cell 1, the light is reflected by the cholesteric liquid crystal in the cholesteric liquid crystal cell 1; On the other hand, when a light having a wavelength similar to the pitch of the cholesteric liquid crystal in the cholesteric liquid crystal cell 1 and having an opposite circular polarization from that of the cholesteric liquid crystal can pass through the cholesteric liquid crystal cell 1 and is irradiated on the first light modulator 2. For example, in this embodiment, if the cholesteric liquid crystal filled in the display panel comprises a left-handed cholesteric liquid crystal, a left-handed circularly polarized light irradiated on the left-handed cholesteric liquid crystal cell 1 is reflected by the left-handed cholesteric liquid crystal, and a right-handed circularly polarized light irradiated on the left-handed cholesteric liquid crystal cell 1 passes through the left-handed cholesteric liquid crystal cell 1 and is irradiated on the first light modulator 2.

At this time, when it needs to achieve a bright state display of the display panel, the drive electrode 22 drives the liquid crystal molecules in the liquid crystal layer 21 to deflect by a certain angle, so as to regulate an amount of the phase retardation of the circularly polarized light emitted from the cholesteric liquid crystal cell 1 into the first light modulator 2 that is generated when the circularly polarized light passes through the first light modulator 2. In this way, after passing through the first light modulator 2, the circularly polarized light is converted into a linearly polarized light having a polarization orientation parallel to the transmission axis of the first linear polarizer 3, and the linearly polarized light having the polarization orientation parallel to the transmission axis a of the first linear polarizer 3 can pass through the first linear polarizer 3. As a result, the bright state display of the display panel is achieved. When it needs to achieve a dark state display of the display panel, the drive electrode 22 again drives the liquid crystal molecules in the liquid crystal layer 21 to deflect by a certain angle, so as to again regulate the amount of the phase retardation of the circularly polarized light emitted from the cholesteric liquid crystal cell 1 into the first light modulator 2 that is generated when the circularly polarized light passes through the first light modulator 2. In this way, after passing through the first light modulator 2, the circularly polarized light is converted into a linearly polarized light having a polarization orientation perpendicular to the transmission axis of the first linear polarizer 3, and the linearly polarized light having the polarization orientation perpendicular to the transmission axis a of the first linear polarizer 3 cannot pass through the first linear polarizer 3. As a result, the dark state display of the display panel is achieved.

Accordingly, in the display panel according to the above exemplary embodiments, it only needs to drive the liquid crystal molecules in the first light modulator 2 to deflect by the drive electrode 22 of the first light modulator 2, the amount of the phase retardation of the circularly polarized light emitted from the cholesteric liquid crystal cell 1 into the first light modulator 2 can be regulated when the circularly polarized light passes through the first light modulator 2. Thereby, the polarization orientation of the circularly polarized light can be changed, and the circularly polarized light can be converted into the linearly polarized light having the polarization orientation parallel to or perpendicular to the transmission axis of the first linear polarizer 3, so that the linearly polarized light is allowed to pass through the first linear polarizer 3 or is blocked by the first linear polarizer 3. If the linearly polarized light with the changed polarization orientation is allowed to pass through the first linear polarizer 3, the bright state display of the display panel is achieved. If the linearly polarized light with the changed polarization orientation is blocked by the first linear polarizer 3, the dark state display of the display panel is achieved.

Accordingly, in this embodiment of the present invention, the bright state display or the dark state display of the display panel can be achieved without providing a drive electrode in the cholesteric liquid crystal cell to drive the cholesteric liquid crystal molecules to deflect. As a result, in the present invention, the drive voltage of the display panel of the cholesteric liquid crystal is decreased, thereby overcoming the problem that the display panel of the cholesteric liquid crystal in the prior art needs a very high drive voltage.

As shown in FIGS. 1-3, in an embodiment, there is not provided any polarizer between the first light modulator 2 and the cholesteric liquid crystal cell 1. That is, there is not provided any polarizer at the side of the first light modulator 2 adjacent to the cholesteric liquid crystal cell 1. In an embodiment, the first light modulator 2 may directly and physically contacts the cholesteric liquid crystal cell 1. In this way, it may reduce a layer of polarizer, thus reducing the dependence on the polarizer to a certain extent, and decreasing the manufacturing cost of the display panel.

For the purpose of facilitating the description, the cholesteric liquid crystal cell 1 is described as the left-handed cholesteric liquid crystal cell in following exemplary embodiments herein. As described above, the circularly polarized light capable of passing through the left-handed cholesteric liquid crystal cell 1 is the right-handed circularly polarized light.

In some exemplary embodiments of the present invention, the first light modulator 2 in the display panel may be configured in two different arrangements as follows.

Figure 4:
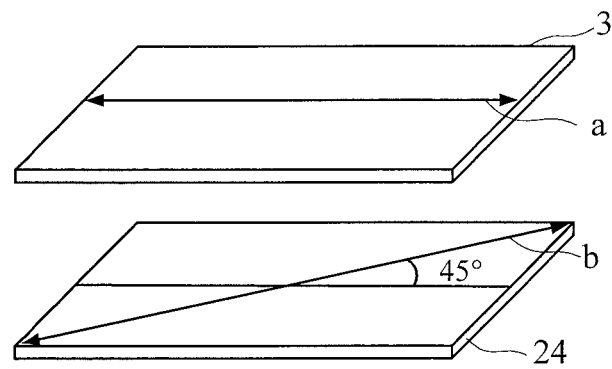
FIG. 4 is an illustrative view of a relative position relation of a quarter-wave plate and a first linear polarizer on the nematic liquid crystal cell of the display panel according to the first exemplary embodiment of the present invention.

FIGS. 2 and 4 show the first arrangement of the first light modulator 2. As shown in FIGS. 2 and 4, the first light modulator 2 comprises a nematic liquid crystal cell 23 and a quarter-wave plate 24 successively disposed at the light output side of the cholesteric liquid crystal cell 1. An angle between an optical axis b of the quarter-wave plate 24 and a transmission axis of the first linear polarizer 3 is set to be equal to 45 degrees. Thereby, in this embodiment, if the optical axis b of the quarter-wave plate 24 is clockwise rotated by 45 degrees, the optical axis b of the quarter-wave plate 24 is parallel to the transmission axis a of the first linear polarizer 3.

As shown in FIGS. 1-2, in an exemplary embodiment, when it needs to achieve the bright state display of the display panel, after a right-handed circularly polarized light from a left-handed cholesteric liquid crystal cell 1 enters into the nematic liquid crystal cell 23, the liquid crystal molecules are driven by the drive electrode 22 to exhibit a planar texture state distribution, that is, a long axis direction of the liquid crystal molecule is perpendicular to a propagation direction of the right-handed circularly polarized light. In this case, the liquid crystal molecule can delay the phase of the right-handed circularly polarized light by $\lambda/2$, that is, a phase retardation of λ/2 can be generated in the right-handed circularly polarized light by the liquid crystal molecules, so that the right-handed circularly polarized light can be converted into a left-handed circularly polarized light. Then, after passing through the quarter-wave plate 24, the converted left-handed circularly polarized light can be converted into a linearly polarized light having a polarization orientation parallel to the transmission axis of the first linear polarizer 3, and thus can pass through the first linear polarizer 3. As a result, the bright state display of the display panel is achieved.

As shown in FIGS. 1 and 3, in an exemplary embodiment, when it needs to achieve the dark state display of the display panel, after a right-handed circularly polarized light transmitted through the left-handed cholesteric liquid crystal cell 1 enters into the nematic liquid crystal cell 23, the liquid crystal molecules are driven to deflect by 90 degrees by use of the drive electrode 22, so that the liquid crystal molecules exhibit a vertical texture state distribution, that is, a long axis direction of the liquid crystal molecule is parallel to a propagation direction of the right-handed circularly polarized light. In this case, no phase retardation can be generated in the right-handed circularly polarized light by the liquid crystal molecules, so that the right-handed circularly polarized light can directly pass through the nematic liquid crystal cell 23 and is irradiated on the quarter-wave plate 24. In this case, after passing through the quarter-wave plate 24, the right-handed circularly polarized light can be converted into a linearly polarized light having a polarization orientation perpendicular to the transmission axis of the first linear polarizer 3, and thus cannot pass through the first linear polarizer 3. As a result, the dark state display of the display panel is achieved. As shown in FIGS. 2-3, in the above first arrangement of the first light modulator 2, the nematic liquid crystal cell 23 may comprise a first glass substrate 231 and a second glass substrate 232 assembled together to form a cell. The liquid crystal layer 21 may comprise a nematic liquid crystal layer filled between the first glass substrate 231 and the second glass substrate 232.

In this embodiment, the drive electrode 22 comprises a pixel electrode 221 disposed on a side of the first glass substrate 231 facing the second glass substrate 232 and a common electrode 222 disposed on a side of the second glass substrate 232 facing the first glass substrate 231, so that liquid crystal molecules of the nematic liquid crystal layer 21 can be driven to deflect in a plane perpendicular to the first glass substrate 231.

In this embodiment, the drive electrode 22 comprises the pixel electrode 221 disposed on the side of the first glass substrate 231 facing the second glass substrate 232 and the common electrode 222 disposed on the side of the second glass substrate 232 facing the first glass substrate 231. Thereby, on one hand, as shown in FIG. 3, when a voltage is applied to the common electrode 222 and the pixel electrode 221, the liquid crystal molecules are driven to deflect from the planar texture state to the vertical texture state in the plane perpendicular to the first glass substrate 231, and the right-handed circularly polarized light is not delayed in the phase and continues to propagate forward in a form of right-handed circularly polarized light. In this case, the right-handed circularly polarized light cannot pass through the quarter-wave plate 24 and the first linear polarizer 3. As a result, the dark state display of the display panel is achieved. On the other hand, as shown in FIG. 2, when there is no voltage applied to the common electrode 222 and the pixel electrode 221, the liquid crystal molecules keep the planar texture state distribution, and thus can delay the phase of the right-handed circularly polarized light from the nematic liquid crystal cell 23 by λ/2, that is, a phase retardation of λ/2 can be generated in the right-handed circularly polarized light by the liquid crystal molecules, so that the right-handed circularly polarized light is converted into the left-handed circularly polarized light, which can successively pass through the quarter-wave plate 24 and the first linear polarizer 3. As a result, the bright state display of the display panel is achieved.

Figure 5:
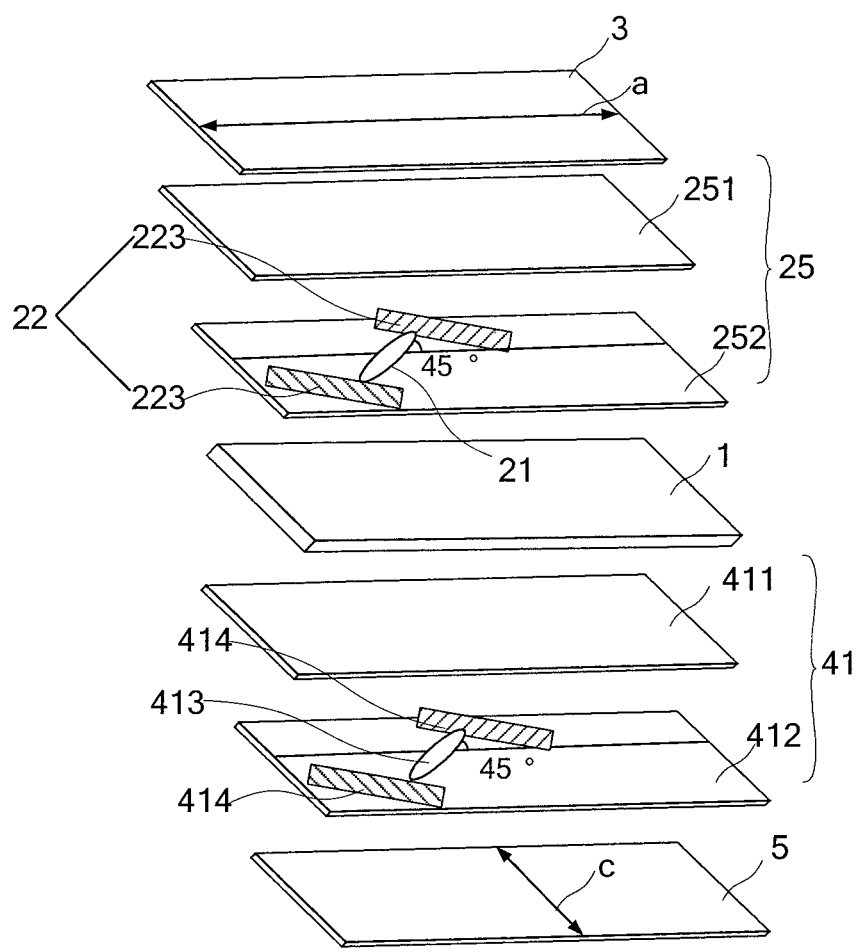
FIG. 5 is an illustrative exploded view of the display panel according to the first exemplary embodiment of the present invention, in which both the first light modulator and the second light modulator are configured to be an in-plane switching (IPS) liquid crystal cell.
Figure 6:
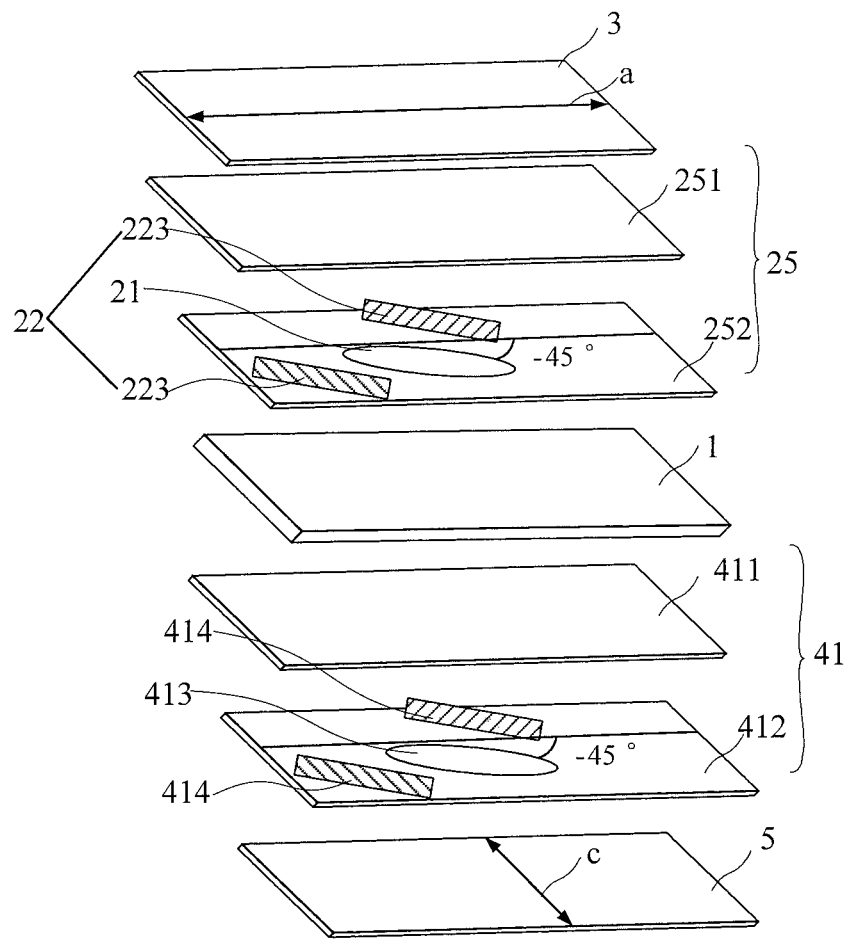
FIG. 6 is an illustrative exploded view of the display panel according to the first exemplary embodiment of the present invention, in which liquid crystal molecules in the in-plane switching liquid crystal cell have been deflected.

FIGS. 5 and 6 show the second arrangement of the first light modulator 2. As shown in FIGS. 5 and 6, the first light modulator 2 is configured to be an in-plane switching (IPS) liquid crystal cell 25 comprising an upper substrate 251 and a lower substrate 252 assembled together to form a cell. The liquid crystal layer 21 comprises a nematic liquid crystal layer 21 filled between the upper substrate 251 and the lower substrate 252.

In the second arrangement, the drive electrode 22 comprises two strip in-plane switching electrodes 223 disposed to oppose to each other between the upper substrate 251 and the lower substrate 252. Two sides, facing each other, of the two strip in-plane switching electrodes 223 are arranged to be perpendicular to a side of the upper substrate 251 facing the lower substrate 252, so as to drive liquid crystal molecules of the nematic liquid crystal layer 21 to deflect in a plane parallel to the upper substrate 251 and the lower substrate 252.

In this embodiment, the original distribution state of the liquid crystal molecules in the IPS liquid crystal cell 25 is a planar texture state, and an angle between an extending direction of the liquid crystal molecules and the transmission axis of the first linear polarizer 3 is set to be equal to 45 degrees.

As shown in FIG. 5, when it needs to achieve the dark state display of the display panel, the liquid crystal molecule in IPS liquid crystal cell 25 is kept in its original state. In this case, the IPS liquid crystal cell 25 functions as a quarter-wave plate 24 having an optical axis forming an angle of 45 degrees relative to the transmission axis of the first linear polarizer 3. After a right-handed circularly polarized light transmitted through a left-handed cholesteric liquid crystal cell 1 passes through the IPS liquid crystal cell 25, and the liquid crystal molecule in the IPS liquid crystal cell 25 delays the phase of the right-handed circularly polarized light by λ/4, that is, a phase retardation of λ/4 is generated in the right-handed circularly polarized light by the liquid crystal molecules. In this way, after passing through the IPS liquid crystal cell 25, the right-handed circularly polarized light is converted into a linearly polarized light having a polarization orientation perpendicular to the transmission axis of the first linear polarizer 3, and blocked by and cannot pass through the first linear polarizer 3. As a result, the dark state display of the display panel is achieved.

As shown in FIG. 6, when it needs to achieve the bright state display of the display panel, the liquid crystal molecules are driven by the two strip in-plane switching electrodes 223 to deflect by 90 degrees in the plane parallel to the upper substrate 251 and the lower substrate 252. In this case, the IPS liquid crystal cell 25 functions as a quarter-wave plate 24 having an optical axis forming an angle of −45 degrees relative to the transmission axis of the first linear polarizer 3. After a right-handed circularly polarized light transmitted through a left-handed cholesteric liquid crystal cell 1 passes through the IPS liquid crystal cell 25, the liquid crystal molecules in the IPS liquid crystal cell 25 delays the phase of the right-handed circularly polarized light by λ/4, that is, a phase retardation of λ/4 is generated in the right-handed circularly polarized light by the liquid crystal molecules. In this way, after passing through the IPS liquid crystal cell 25, the right-handed circularly polarized light is converted into a linearly polarized light having a polarization orientation parallel to the transmission axis of the first linear polarizer 3, and thus can pass through the first linear polarizer 3. As a result, the bright state display of the display panel is achieved.

As shown in FIGS. 5-6, in the above second arrangement of the first light modulator 2, the angle between an extending direction of the two strip in-plane switching electrodes 223 and the transmission axis of the first linear polarizer 3 is set to be equal to 45 degrees. In this way, it can ensure that the liquid crystal molecules can be driven to deflect by 90 degrees after a voltage is applied to the two strip in-plane switching electrodes 223. The angle between the extending direction of the deflected liquid crystal molecule and the transmission axis of the first linear polarizer 3 is changed to be equal to −45 degrees, so as to achieve the bright state display of the display panel.

Figure 7:
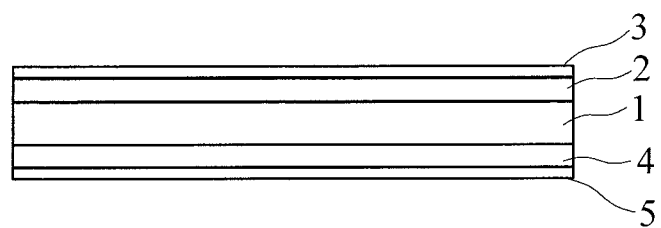
FIG. 7 is an illustrative configuration view of the display panel with a second light modulator and a second linear polarizer according to the first exemplary embodiment of the present invention.

As shown in FIG. 7, in an exemplary embodiment of the present invention, the display panel may further comprise a second light modulator 4 and a second linear polarizer 5 successively disposed at a light input side of the cholesteric liquid crystal cell 1. The second light modulator 4 and the second linear polarizer 5 are configured to convert a light irradiated toward the cholesteric liquid crystal cell 1 into a circularly polarized light. A transmission axis c of the second linear polarizer 5 is arranged to be perpendicular to the transmission axis a of the first linear polarizer 3.

In the above exemplary embodiment, after a natural light passes through the second linear polarizer 5, a linearly polarized light having a polarization orientation parallel to the transmission axis c of the second linear polarizer 5 is obtained, and when the linearly polarized light passes through the second light modulator 4 to be converted into a circularly polarized light having an opposite circular polarization from the circular polarization of the cholesteric liquid crystal cell 1, and thus can pass through the cholesteric liquid crystal cell 1 and is irradiated toward the first light modulator 2. For example, in this embodiment, if the cholesteric liquid crystal cell 1 of the display panel comprises a left-handed cholesteric liquid crystal cell, and when a light successively passes through the second linear polarizer 5 and the second light modulator 4, it can be converted into a right-handed circularly polarized light and is irradiated toward the first light modulator 2. Then, the liquid crystal molecules in the first light modulator 2 can be driven, according to a requirement of display effect of the display panel, to deflect by the drive electrode 22 of the first light modulator 2, so as to change the polarization orientation of the polarized light passed through the first light modulator 2. The polarized light whose polarization orientation has been changed can pass through or be blocked by the first linear polarizer 3. As a result, the bright state display or the dark state display of the display panel is achieved.

Accordingly, the display panel comprising the above second light modulator 4 and the second linear polarizer 5 can be used with a backlight source with a conventional configuration, thereby widening the application of the above display panel.

In the prior arts, as for the display panel in which the cholesteric liquid crystal is driven by the drive electrode to deflect, the cholesteric liquid crystal cannot quickly deflect in response to the drive electrode. However, in the above first and second arrangements of the present invention, regardless of the case that the liquid crystal molecules in the nematic liquid crystal cell are driven to deflect by use of the common electrode 222 and the pixel electrode 221 or that the liquid crystal molecules in IPS liquid crystal cell are driven to deflect by use of the two strip in-plane switching electrodes 223, the liquid crystal molecule can quickly deflect in response to the electrodes, ensuring that the display panel of the present invention has a quick response speed.

In some exemplary embodiments of the present invention, the second light modulator 4 in the display panel also may be configured in two different arrangements as follows.

In order to distinguish the two arrangements of the second light modulator 4 from the two arrangements of the first light modulator 2, the two arrangements of the second light modulator 4 are referred to as a third arrangement and a fourth arrangement herein.

FIGS. 5 and 6 show the third arrangement. As shown in FIGS. 5-6, the second light modulator 4 is configured to be an in-plane switching (IPS) liquid crystal cell 41 comprising an upper substrate 411 and a lower substrate 412 assembled together to form a cell. A nematic liquid crystal layer 413 is filled between the upper substrate 411 and the lower substrate 413. Two strip in-plane switching electrodes 414 are disposed to oppose to each other between the upper substrate 411 and the lower substrate 412 of the second light modulator 4, so that the liquid crystal molecules of the nematic liquid crystal layer can be driven to deflect in a plane parallel to the upper substrate 411 and the lower substrate 412 of the second light modulator 4.

In this embodiment, an original distribution state of the liquid crystal molecules in the IPS liquid crystal cell 41 of the second light modulator 4 is same as the original distribution state of the liquid crystal molecules in the IPS liquid crystal cell 25 of the first light modulator 2, that is, an angle between the long axis direction of the liquid crystal molecules in the IPS liquid crystal cell 41 and the transmission axis a of the first linear polarizer 3 is set to be equal to 45 degrees, and an angle between the long axis direction of the liquid crystal molecules and the transmission axis c of the second linear polarizer 5 is set to be equal to −45 degrees.

When a linearly polarized light from the second linear polarizer 5 is irradiated on the IPS liquid crystal cell 41, the liquid crystal molecules can be driven by the two strip in-plane switching electrodes 414 to deflect according to the requirement of display effect of the display panel. As a result, after passing through the IPS liquid crystal cell 41, the linearly polarized light can be converted into a left-handed circularly polarized light or a right-handed circularly polarized light.

For example, the linearly polarized light passed through the second linear polarizer 5 has a polarization orientation parallel to the transmission axis c of the second linear polarizer 5 and perpendicular to the transmission axis a of the first linear polarizer 3. In this case, if there is no voltage applied to the two strip in-plane switching electrodes 414, the liquid crystal molecules in the IPS liquid crystal cell 41 keep its original state, and the linearly polarized light can be converted into the left-handed circularly polarized light after passing through the IPS liquid crystal cell 41, and cannot pass through the left-handed cholesteric liquid crystal cell 1. If a voltage is applied to the two strip in-plane switching electrodes 414, so that the liquid crystal molecules in the IPS liquid crystal cell 41 are driven to deflect by 90 degrees in a plane parallel to the upper substrate 411 and the lower substrate 412, and the angle between the long axis direction of the liquid crystal molecules and the transmission axis c of the second linear polarizer 5 become 45 degrees, the linearly polarized light can be converted into the right-handed circularly polarized light after passing through the IPS liquid crystal cell 41, and thus can pass through the left-handed cholesteric liquid crystal cell 1.

As shown in FIGS. 5 and 6, in the above third arrangement, both angles between the extending directions of the two strip in-plane switching electrodes 414 and the transmission axis c of the second linear polarizer 5 are set to be 45 degrees, so as to ensure that the liquid crystal molecules are driven by the two strip in-plane switching electrodes 414 to deflect 90 degrees. As a result, the angle between the long axis direction of the deflected liquid crystal molecules and the transmission axis c of the second linear polarizer 5 becomes 45 degrees, so that the light can be converted into the right-handed circularly polarized light after successively passing through the second linear polarizer 5 and IPS liquid crystal cell 41, and thus can pass through the left-handed cholesteric liquid crystal.

Figure 8:
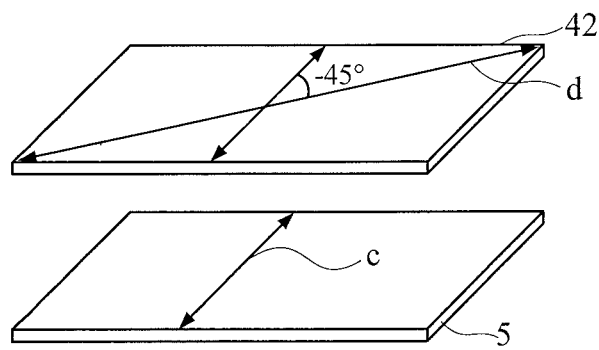
FIG. 8 is an illustrative view of a relative position relation of the second light modulator and the second linear polarizer of the display panel according to the first exemplary embodiment of the present invention.

FIG. 8 shows the fourth arrangement. As shown in FIG. 4, the second light modulator 4 may be configured to be a quarter-wave plate 42, and an angle between an optical axis d of the quarter-wave plate 42 and the transmission axis c of the second linear polarizer 5 is set to be equal to −45 degrees. Thereby, in this arrangement, if the optical axis d of the quarter-wave plate 42 is counterclockwise rotated by 45 degrees, the optical axis d of the quarter-wave plate 42 becomes parallel to the transmission axis c of the second linear polarizer 5.

A natural light can be converted into the right-handed circularly polarized light after passing through the second linear polarizer 5 and the quarter-wave plate 42, and thus can pass through the left-handed cholesteric liquid crystal cell 1 and is irradiated on the first light modulator 2. Then, the first light modulator 2 can modulate the polarization orientation of the right-handed circularly polarized light according to the requirement of display effect of the display panel, so as to achieve the bright state display or the dark state display of the display panel.

Please be noted that the display panel is described by taking the left-handed cholesteric liquid crystal cell 1 as the example of the cholesteric liquid crystal cell in the above embodiments, but the present invention is not limited to this, and the display panel may comprise the right-handed cholesteric liquid crystal cell. The operations of bright state display and dark state display of the display panel having the right-handed cholesteric liquid crystal cell are similar to those of the display panel having the left-handed cholesteric liquid crystal cell, that is, the bright state display or the dark state display of the display panel can be achieved by driving the liquid crystal molecules in the first light modulator 2 to deflect by use of the drive electrode 22. Thereby, the description about the display panel having the right-handed cholesteric liquid crystal cell is omitted herein.

Second Embodiment

In the second embodiment, there is provided a display apparatus comprising a backlight source and a display panel according to any one of above embodiments. The display panel is disposed at a light output side of the backlight source.

In the display panel according to any one of above embodiments, the bright state display or the dark state display of the display panel can be achieved only by driving the liquid crystal molecules in the first light modulator 2 to deflect without providing a drive electrode in the cholesteric liquid crystal cell 1 to drive the cholesteric liquid crystal to deflect. As a result, in the display apparatus having the above display panel according to this embodiment of present invention, it does not need to provide the drive electrode in the cholesteric liquid crystal cell to drive the cholesteric liquid crystal molecule to deflect yet, thereby overcoming the problem that the display panel of the cholesteric liquid crystal in the prior arts needs a very high drive voltage.

Figure 9:
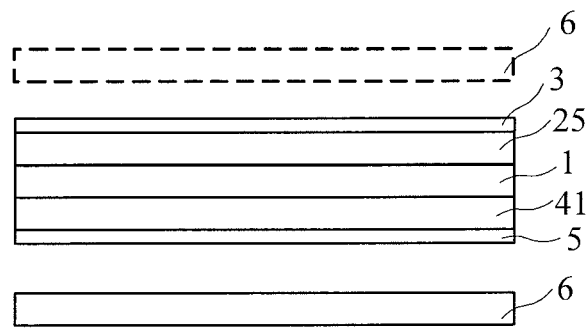
FIG. 9 is an illustrative configuration view of a display apparatus according to a second exemplary embodiment of the present invention, in which both of a first light modulator and a second light modulator are configured to be an in-plane switching liquid crystal cell.

Also, please refer to FIG. 9, as for the display panel in which both of the first light modulator 2 and the second light modulator 4 are configured to be an IPS liquid crystal cell, the backlight source 6 may be disposed at a side of the first linear polarizer 3 opposite from the cholesteric liquid crystal cell 1 or at a side of the second linear polarizer 5 opposite from the cholesteric liquid crystal cell 1.

Figure 10:
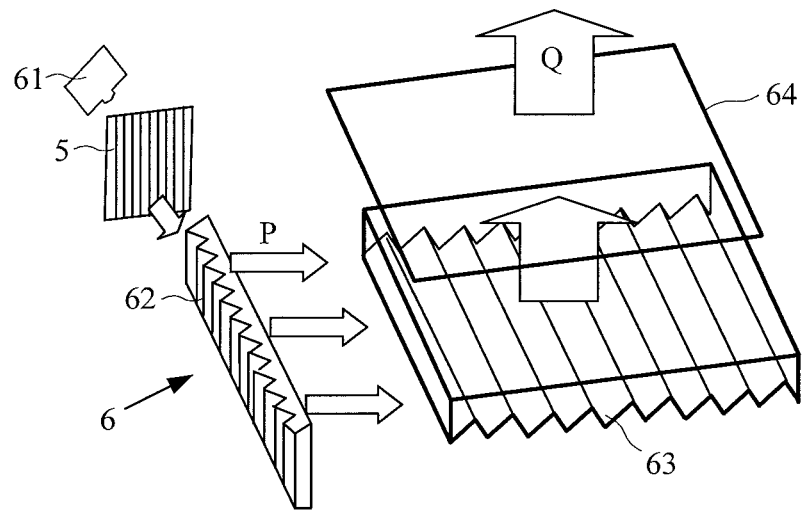
FIG. 10 is an illustrative configuration view of a backlight source of the display apparatus according to the second exemplary embodiment of the present invention.

Also, as for the display panel in which the second linear polarizer 5 and the second light modulator 4 are provided, in an exemplary embodiment, the second linear polarizer 5 may be directly disposed inside the backlight source 6, so that the backlight source 6 is configured to be capable of outputting a linearly polarized light. As shown in FIG. 10, the backlight source 6 may comprise a laser source 61, a second linear polarizer 5 disposed at a light output side of the laser source 61, a first light guide plate 62 and a second light guide plate 63 disposed at a side of the second linear polarizer 5 opposite from the laser source 61, and a diffusion sheet 64 disposed at a light output side of the second light guide plate 63. In an exemplary embodiment, both of the first light guide plate 62 and the second light guide plate 63 are configured to be a side entering type of light guide plate. The light output side of the first light guide plate 62 faces the light input side of the second light guide plate 63, and the light input side of the first light guide plate 62 is perpendicular to the light output side of the second light guide plate 63.

The light emitted from the laser source 61 can be converted into a linearly polarized light P having a polarization orientation parallel to the transmission axis c of the second linear polarizer 5 after passing through the second linear polarizer 5, and the linearly polarized light P can enter into the first light guide plate 62 from the light input side of the first light guide plate 62, be reflected many times inside the first light guide plate 62, and exit from the light output side of the first light guide plate 62. Then, the linearly polarized light P can enter into the second light guide plate 63 from the light input side of the second light guide plate 63, be reflected many times inside the second light guide plate 63, be converted into a linearly polarized light Q having a polarization orientation perpendicular to the transmission axis c of the second linear polarizer 5, and exit from the light output side of the second light guide plate 63 and is irradiated on the diffusion sheet 64. After passing through the diffusion sheet 64, the linearly polarized light Q is uniformly emitted from the backlight source 6, so as to provide the linearly polarized light for the above display panel.

Accordingly, if the second linear polarizer 5 is directly disposed inside the backlight source 6, the backlight source 6 can directly emit the linearly polarized light. After passing through the quarter-wave plate of the display panel in the first embodiment, the linearly polarized light emitted from the backlight source 6 is converted into the circularly polarized light, which has the opposite circular polarization from the circular polarization of the cholesteric liquid crystal cell of the display panel of the first embodiment, and can pass through the cholesteric liquid crystal cell. As a result, the utilization of the light emitted from the backlight source is increased.

Please be noted that the configuration of the backlight source is not limited to the embodiment shown in FIG. 10, and it may adopt any other suitable configuration.

Figure 11:
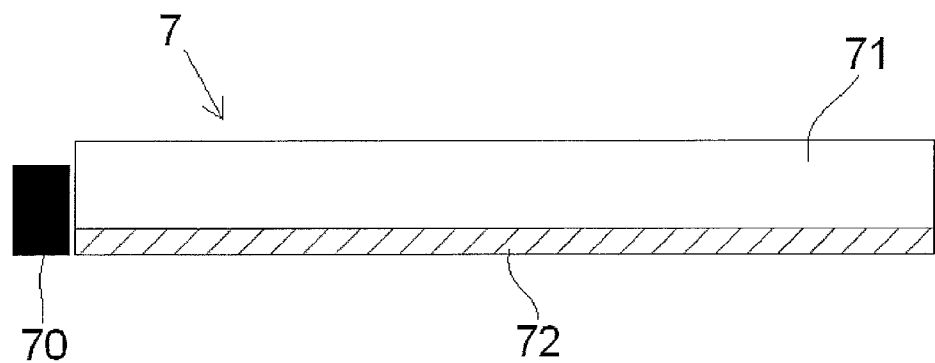
FIG. 11 is an illustrative configuration view of a backlight source according to another exemplary embodiment of the present invention.
Figure 12:
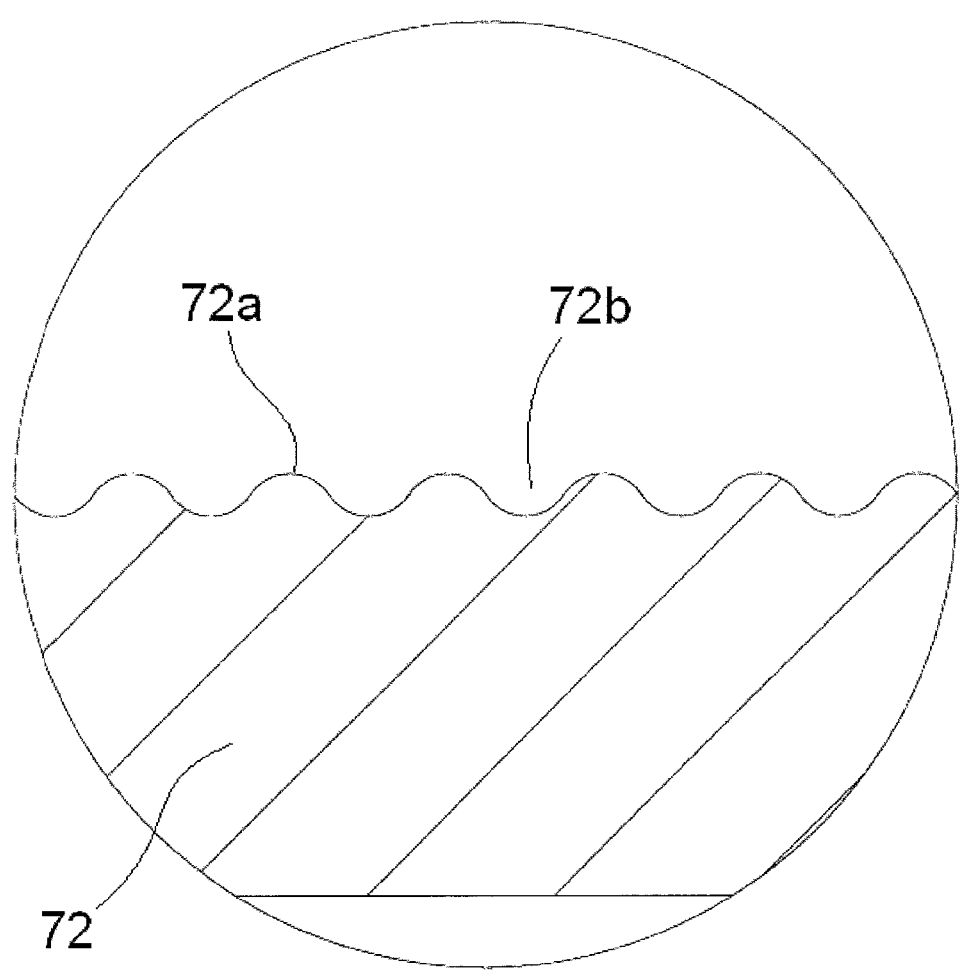
FIG. 12 is an illustrative local enlarged view of a reflection surface of a reflection layer in the backlight source shown in FIG. 11.

FIG. 11 is an illustrative configuration view of a backlight source 7 according to another exemplary embodiment of the present invention; FIG. 12 is an illustrative local enlarged view of a reflection surface of a reflection layer 72 in the backlight source 7 shown in FIG. 11.

As shown in FIG. 11, the backlight source 7 mainly comprises: a light source 70, a light guide plate 71 provided near the light source 70, and a refection layer 72 provided below the light guide plate 71. In an embodiment, the light source 70 may be a common LED light source.

As shown in FIG. 12, a microstructure including convexes 72a and concaves 72b is formed on a reflection surface of the refection layer 72. In an embodiment, these micro convexes 72a and micro concaves 72b may be arranged on the reflection surface of the refection layer 72 in a regular pattern.

In the illustrated embodiment shown in FIGS. 11-12, these micro convexes 72a and micro concaves 72b formed on the reflection surface of the refection layer 72 may depolarize the polarized light, and the depolarized polarized light may be reused. Thereby, it greatly improves the utilization rate of the back light. It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display panel, comprising:
    a cholesteric liquid crystal cell configured to convert a light passing therethrough into a polarized light;
    a first light modulator, which is provided at a light output side of the cholesteric liquid crystal cell and directly contacts the cholesteric liquid crystal cell, configured to generate a phase retardation in the polarized light passing therethrough so as to modulate a polarization of the polarized light;
    a first linear polarizer provided at a side of the first light modulator opposite from the cholesteric liquid crystal cell and configured to selectively permit the polarized light modulated by the first light modulator to pass therethrough.

2. The display panel according to claim 1,
    wherein the first light modulator comprises a nematic liquid crystal cell and a quarter-wave plate successively disposed at the light output side of the cholesteric liquid crystal cell; and
    wherein an angle between an optical axis of the quarter-wave plate and a transmission axis of the first linear polarizer is set to be equal to 45 degrees.

3. The display panel according to claim 2,
    wherein the nematic liquid crystal cell comprises: a first substrate, a second substrate assembled together, a nematic liquid crystal layer filled between the first substrate and the second substrate and a drive electrode;
    wherein the drive electrode comprises a pixel electrode disposed on a side of the first substrate facing the second substrate and a common electrode disposed on a side of the second substrate facing the first substrate, so that liquid crystal molecules of the nematic liquid crystal layer can be driven to deflect in a plane perpendicular to the first substrate.

4. The display panel according to claim 1,
    wherein the light modulator is configured to be an in-plane switching liquid crystal cell comprising: an upper substrate and a lower substrate assembled together, a nematic liquid crystal layer filled between the upper substrate and the lower substrate and a drive electrode;
    wherein the drive electrode comprises two opposite strip in-plane switching electrodes disposed between the upper substrate and the lower substrate; and
    wherein two sides, facing each other, of the two opposite strip in-plane switching electrodes are arranged to be perpendicular to a side of the upper substrate facing the lower substrate, so as to drive the liquid crystal molecules of the nematic liquid crystal layer to deflect in a plane parallel to the upper substrate and the lower substrate.

5. The display panel according to claim 4,
    wherein an angle between a direction in which the two opposite strip in-plane switching electrodes extend and a transmission axis of the first linear polarizer is set to be equal to 45 degrees.

6. The display panel according to claim 1, further comprising:
    a second light modulator and a second linear polarizer, successively disposed at a light input side of the cholesteric liquid crystal cell, and configured to convert a light irradiated toward the cholesteric liquid crystal cell into a circularly polarized light,
    wherein a transmission axis of the second linear polarizer is arranged to be perpendicular to a transmission axis of the first linear polarizer.

7. The display panel according to claim 6,
    wherein the second light modulator is configured to be an in-plane switching liquid crystal cell comprising an upper substrate and a lower substrate assembled together;
    a nematic liquid crystal layer is filled between the upper substrate and the lower substrate of the second light modulator; and
    wherein two strip in-plane switching electrodes are disposed to oppose to each other between the upper substrate and the lower substrate of the second light modulator, so as to drive the liquid crystal molecules of the nematic liquid crystal layer to deflect in a plane parallel to the upper substrate of the second light modulator.

8. The display panel according to claim 7,
    wherein an angle between a direction in which the two strip in-plane switching electrodes of the second light modulator extend and a transmission axis of the second linear polarizer is set to be equal to 45 degrees.

9. The display panel according to claim 6,
    wherein the second light modulator comprises a quarter-wave plate; and
    wherein an angle between an optical axis of the quarter-wave plate and a transmission axis of the second linear polarizer is set to be equal to −45 degrees.

10. The display panel according to claim 2, further comprising:
a second light modulator and a second linear polarizer, successively disposed at a light input side of the cholesteric liquid crystal cell, and configured to convert a light irradiated toward the cholesteric liquid crystal cell into a circularly polarized light,
wherein a transmission axis of the second linear polarizer is arranged to be perpendicular to a transmission axis of the first linear polarizer.

11. The display panel according to claim 10,
wherein the second light modulator is configured to be an in-plane switching liquid crystal cell comprising an upper substrate and a lower substrate assembled together;
a nematic liquid crystal layer is filled between the upper substrate and the lower substrate of the second light modulator; and
wherein two strip in-plane switching electrodes are disposed to oppose to each other between the upper substrate and the lower substrate of the second light modulator, so as to drive the liquid crystal molecules of the nematic liquid crystal layer to deflect in a plane parallel to the upper substrate of the second light modulator.

12. The display panel according to claim 11,
wherein an angle between a direction in which the two strip in-plane switching electrodes of the second light modulator extend and a transmission axis of the second linear polarizer is set to be equal to 45 degrees.

13. The display panel according to claim 10,
wherein the second light modulator comprises a quarter-wave plate; and
wherein an angle between an optical axis of the quarter-wave plate and a transmission axis of the second linear polarizer is set to be equal to −45 degrees.

14. The display panel according to claim 3, further comprising:
a second light modulator and a second linear polarizer, successively disposed at a light input side of the cholesteric liquid crystal cell, and configured to convert a light irradiated toward the cholesteric liquid crystal cell into a circularly polarized light,
wherein a transmission axis of the second linear polarizer is arranged to be perpendicular to a transmission axis of the first linear polarizer.

15. The display panel according to claim 14,
wherein the second light modulator is configured to be an in-plane switching liquid crystal cell comprising an upper substrate and a lower substrate assembled together;
a nematic liquid crystal layer is filled between the upper substrate and the lower substrate of the second light modulator; and
wherein two strip in-plane switching electrodes are disposed to oppose to each other between the upper substrate and the lower substrate of the second light modulator, so as to drive the liquid crystal molecules of the nematic liquid crystal layer to deflect in a plane parallel to the upper substrate of the second light modulator.

16. The display panel according to claim 4, further comprising:
a second light modulator and a second linear polarizer, successively disposed at a light input side of the cholesteric liquid crystal cell, and configured to convert a light irradiated toward the cholesteric liquid crystal cell into a circularly polarized light,
wherein a transmission axis of the second linear polarizer is arranged to be perpendicular to a transmission axis of the first linear polarizer.

17. A display apparatus, comprising:
a backlight source; and
a display panel according to claim 1, disposed at a light emitting side of the backlight source.

18. The display apparatus according to claim 17,
wherein the display panel further comprises a second light modulator and a second linear polarizer, which are successively disposed at a light input side of the cholesteric liquid crystal cell and configured to convert a light irradiated toward the cholesteric liquid crystal cell into a circularly polarized light;
wherein a transmission axis of the second linear polarizer is arranged to be perpendicular to a transmission axis of the first linear polarizer; and
wherein the second linear polarizer is directly disposed inside the backlight source.

19. The display apparatus according to claim 17,
wherein the backlight source comprises:
a laser source;
a second linear polarizer disposed at a light output side of the laser source;
a first light guide plate and a second light guide plate disposed at a side of the second linear polarizer opposite from the laser source; and
a diffusion sheet disposed at a light output side of the second light guide plate,
wherein the display panel further comprises a second light modulator disposed at a light input side of the cholesteric liquid crystal cell, and the second light modulator and the second linear polarizer are configured to together convert a light irradiated toward the cholesteric liquid crystal cell into a circularly polarized light; and
wherein a transmission axis of the second linear polarizer is arranged to be perpendicular to a transmission axis of the first linear polarizer.

20. The display apparatus according to claim 17,
wherein the backlight source comprises: a light source, a light guide plate provided near the light source, and a refection layer provided below the light guide plate;
wherein a microstructure including convexes and concaves is formed on a reflection surface of the refection layer.

* * * * *